United States Patent
Singh

(10) Patent No.: US 8,527,441 B2
(45) Date of Patent: Sep. 3, 2013

(54) DEVELOPING FAULT MODEL FROM SERVICE PROCEDURES

(75) Inventor: Satnam Singh, Bangalore (IN)

(73) Assignee: GM Global Technology Operations LLC, Detroit, MI (US)

(*) Notice: Subject to any disclaimer, the term of this patent is extended or adjusted under 35 U.S.C. 154(b) by 319 days.

(21) Appl. No.: 13/045,221

(22) Filed: Mar. 10, 2011

(65) Prior Publication Data

US 2012/0232743 A1    Sep. 13, 2012

(51) Int. Cl.
*G06F 17/00* (2006.01)
*G06F 7/00* (2006.01)
*G06F 11/00* (2006.01)

(52) U.S. Cl.
USPC ..................... 706/45; 701/29.1; 714/100

(58) Field of Classification Search
None
See application file for complete search history.

(56) References Cited

U.S. PATENT DOCUMENTS

| | | | |
|---|---|---|---|
| 6,768,935 B1* | 7/2004 | Morgan et al. | 701/29.6 |
| 7,096,210 B1 | 8/2006 | Kramer et al. | |
| 2008/0183351 A1* | 7/2008 | Grier et al. | 701/29 |
| 2012/0233112 A1* | 9/2012 | Rajpathak et al. | 706/54 |

OTHER PUBLICATIONS

Nolan, Mary et al., "Re-Engineering Legacy Tech Manual's Troubleshooting Procedures into Smart Model-Based Diagnostics", 0-7803-4162-7/97 1997 IEEE, pp. 1-7.

* cited by examiner

*Primary Examiner* — Alan Chen
(74) *Attorney, Agent, or Firm* — John A. Miller; Miller IP Group, PLC

(57) ABSTRACT

A method and system for developing fault models from structured text documents, such as service procedures. A service procedure or other structured text document is parsed using diagnostic rules to extract symptoms, failure modes, and correlations. Testing procedures and repair instructions are also parsed to create a fault tree and identify additional symptoms and failure modes. Reachability analysis is then used to find hidden dependencies in the fault tree, thus yielding additional correlations. The resultant symptoms, failure modes, and correlations are then assembled into a fault model, which can be used for real-time fault diagnosis onboard a vehicle, or for off-board diagnosis at service shops.

20 Claims, 3 Drawing Sheets

DEVELOPING FAULT MODEL FROM SERVICE PROCEDURES

BACKGROUND OF THE INVENTION

1. Field of the Invention

This invention relates generally to a method and system for developing fault models and, more particularly, to a method and system for developing fault models from structured text document sources, such as service procedures, which extracts symptoms, failure modes, serviceable parts, and correlations among them from diagnostic fault information in the document, parses testing procedures to identify more fault model data, uses reachability analysis to find hidden dependencies, and assembles all of the extracted data into a resultant fault model.

2. Discussion of the Related Art

Modern vehicles are complex electro-mechanical systems that employ many sub-systems, components, devices, and modules, which pass operating information between and among each other using sophisticated algorithms and data buses. As with anything, these types of devices and algorithms are susceptible to errors, failures and faults that can affect the operation of the vehicle. To help manage this complexity, vehicle manufacturers develop fault models, which match the various failure modes with the symptoms exhibited by the vehicle.

Vehicle manufacturers commonly develop fault models from a variety of different data sources. These data sources include engineering data, service procedure documents, text verbatim from customers and repair technicians, warranty data, and others. While all of these fault models can be useful tools for diagnosing and repairing problems, the development of the fault models can be time-consuming, labor intensive, and in some cases somewhat subjective. In addition, manually-created fault models may not consistently capture all of the failures modes, symptoms, and correlations which exist in the vehicle systems. Furthermore, a wealth of fault model data resides in legacy service documents, where it is often only partially extracted, or is overlooked altogether because of the difficult and error-prone nature of manually translating text into failure modes, symptoms, serviceable parts, and correlation data.

There is a need for a method for developing fault models from different types of structured textual data sources. Such a method could not only reduce the amount of time and effort required to create fault models, but could also produce fault models with more and better content, thus leading to more accurate failure mode diagnoses in the field, reduced repair time and cost, improved first time fix rate, and improved customer satisfaction.

SUMMARY OF THE INVENTION

In accordance with the teachings of the present invention, a method and system are disclosed for developing fault models from structured text documents, such as service procedures. A service procedure or other structured text document is parsed using diagnostic rules to extract symptoms, failure modes, serviceable parts, and correlations among them. Testing procedures and repair instructions are also parsed to create a fault tree and identify additional symptoms and failure modes. Reachability analysis is then used to find hidden dependencies in the fault tree, thus yielding additional correlations among faults and symptoms. The resultant symptoms, failure modes, serviceable parts, and correlations are then assembled into a fault model, which can be used for real-time fault diagnosis onboard a vehicle, or for off-board diagnosis at service shops.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for developing fault models from structured text documents is merely exemplary in nature, and is in no way intended to limit the invention or its applications or uses. For example, the present invention has particular application for vehicle fault diagnosis. However, the invention is equally applicable to fault diagnosis in other industries, such as aerospace and heavy equipment, and to fault diagnosis in any mechanical, electrical, or electro-mechanical system where fault models are used.

Fault models have long been used by manufacturers of vehicles and other systems to document and understand the correlation between failure modes, serviceable parts, and associated symptoms. The failure mode, part, and symptom data which is the basis of a fault model can be found in a variety of documents, including textual documents. But because text documents can be difficult and time-consuming to review for fault model content, many types of text documents have traditionally not been used to develop fault models for particular vehicles or systems, and thus manufacturers have not gained the benefit of all of the data contained in the text documents. The present invention provides a solution to this problem, by proposing a method and system for automatically developing fault models from structured text documents. A fault model developed in this manner can be used directly as a fault diagnosis tool, or it can be used as a baseline for rapid development of a high fidelity engineering fault model.

Figure 1:
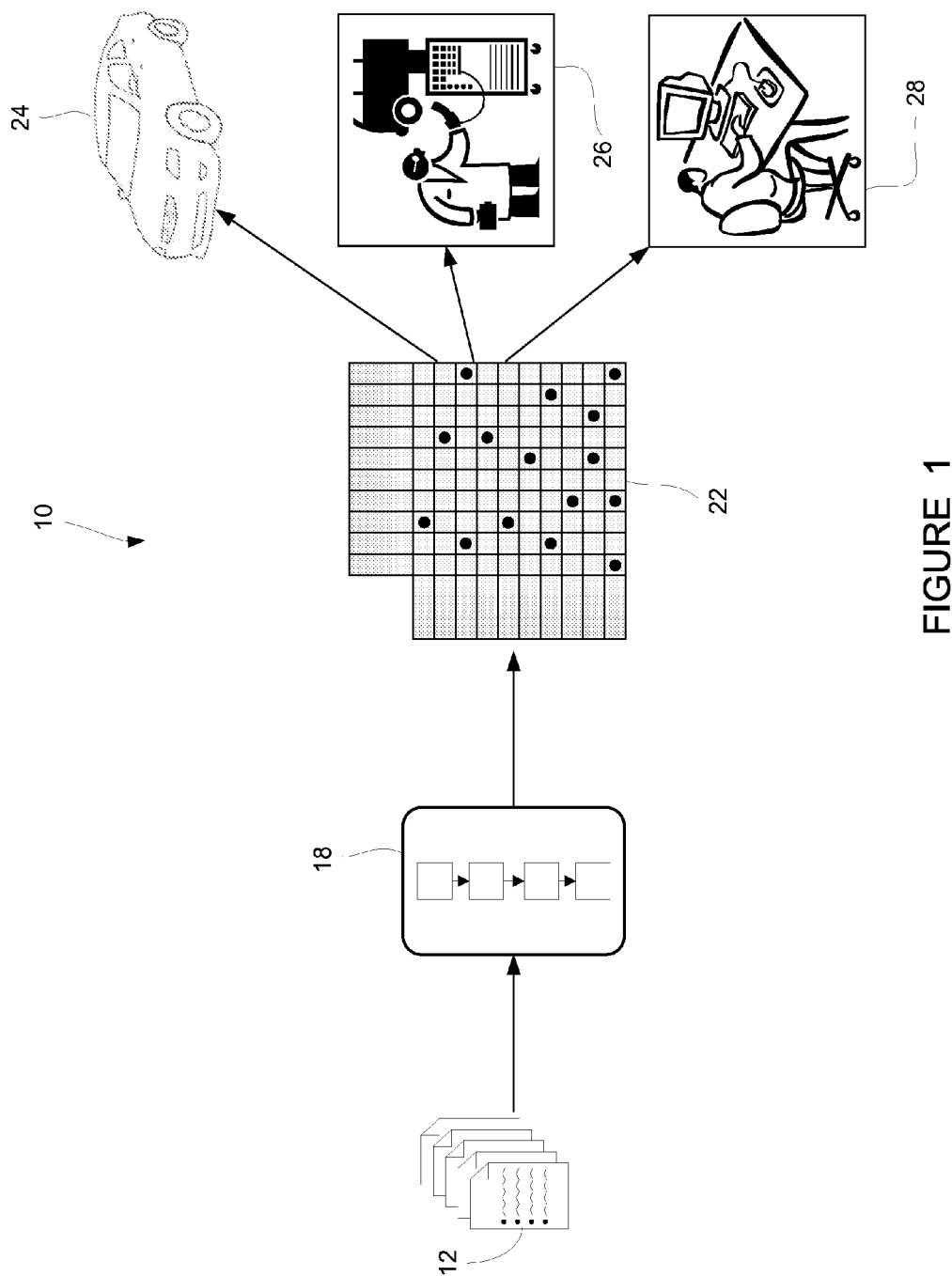
FIG. 1 is a schematic diagram of a system which takes structured text documents, automatically parses them using an appropriate process to produce a fault model, and uses the resultant fault model in both onboard and off-board systems.

FIG. 1 is a schematic diagram of a system 10 which takes structured text document input, applies text-processing rules, parsing techniques, and other types of analysis to create a fault model, and uses the resultant fault model for diagnostic purposes, both onboard a vehicle and off-board. The system 10 is shown using a service procedure document 12 as input. Other types of structured text documents may also be used, but discussion of the document 12 will be sufficient to explain the concepts involved in fault model development. The service procedure document 12 may include diagnostic fault information tables, circuit & system testing procedures, scan tool tables, and repair instructions, along with many other types of service procedures.

A structured text parsing module 18 can receive the service procedure document 12 and perform several parsing and analysis steps, described below, to produce a fault model 22. The fault model 22 contains a representation of the failure modes and symptoms described in the document 12. As a digital database, the fault model 22 can be loaded into a processor onboard a vehicle 24 for real-time system monitoring, or used in a diagnostic tool 26 at a service facility. In the form of a database, the fault model 22 can also be used at a remote diagnostic center for real-time troubleshooting of vehicle problems. For example, vehicle symptom data and customer complaints could be sent via a telematics system to the remote diagnostic center, where a diagnostic reasoner could make a diagnosis using the fault model 22. Then a customer advisor could advise the driver of the vehicle 24 on the most appropriate course of action. As a printable document, the fault model 22 can read by a technician servicing a vehicle, or used by vehicle development personnel 28 for creation of improved service procedure documents and new vehicle and system designs.

A simplistic representation of the fault model 22 is a two-dimensional matrix that contains failure modes as rows, symptoms as columns, and a correlation value in the intersection of each row and column. Part identification data is typically contained in the failure modes. The correlation value contained in the intersection of a row and a column is commonly known as a causality weight. In the simplest case, the causality weights all have a value of either 0 or 1, where a 0 indicates no correlation between a particular failure mode and a particular symptom, and a 1 indicates a direct correlation between a particular failure mode and a particular symptom. However, causality weight values between 0 and 1 can also be used, and indicate the level of strength of the correlation between a particular failure mode and a particular symptom. Causality weight values of 0 and 1 are often known as hard causalities or correlations, while causality weight values between 0 and 1 are described as soft. Where more than one failure mode is associated with a particular symptom or set of symptoms, this is known as an ambiguity group.

In a more complete form, the fault model 22 could include additional matrix dimensions containing information such as signals and actions, as they relate to the failure modes and symptoms. For clarity, however, the text document-based fault model development methodology will be described in terms of the two primary matrix dimensions, namely failure modes and symptoms, with serviceable part information included as appropriate.

Figure 2:
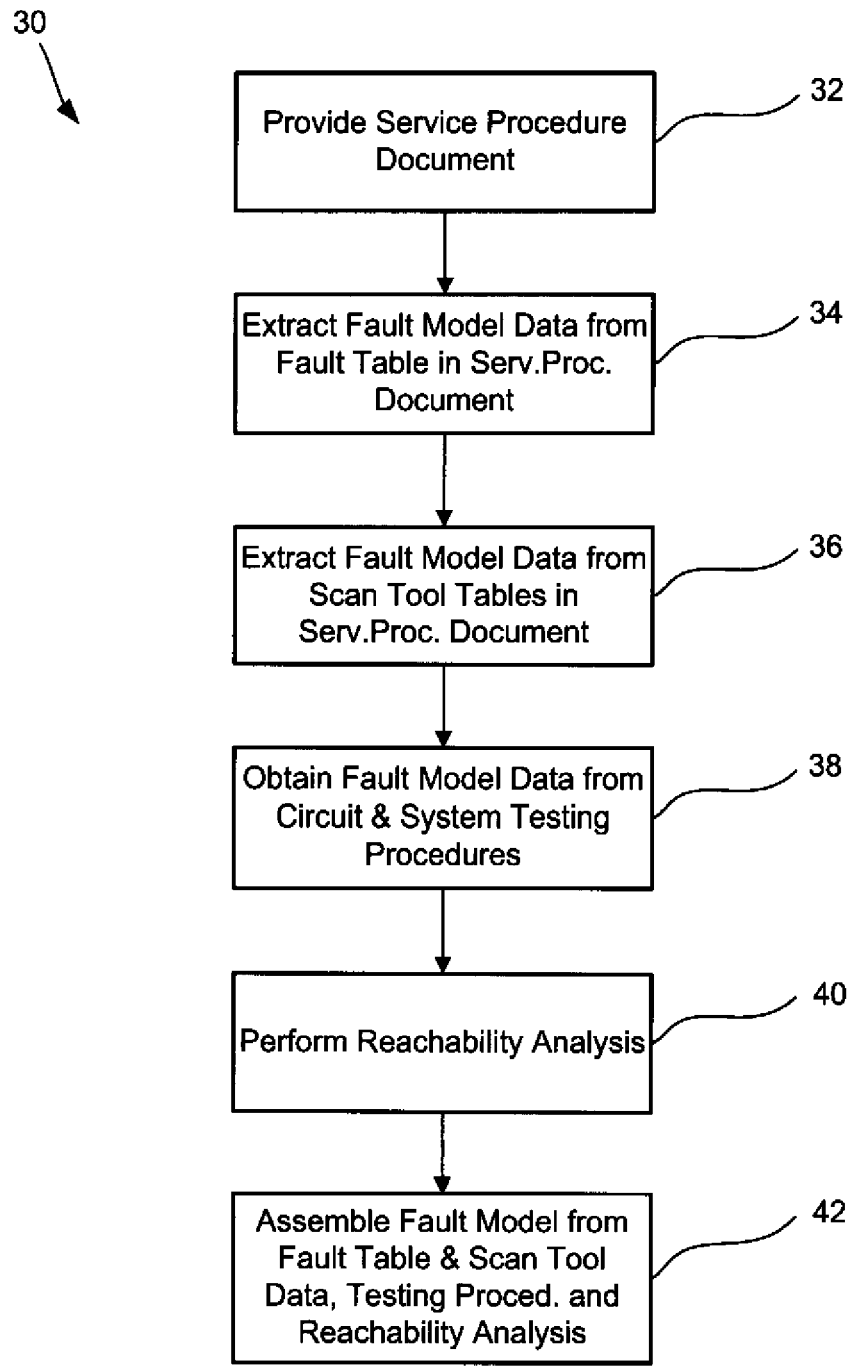
FIG. 2 is a flow chart diagram of a method that can be used to develop fault models from structured text documents, such as service procedures.

FIG. 2 is a flow chart diagram 30 of a method that can be used in the structured text parsing module 18 to create the fault model 22 from the service procedure document 12. At box 32, the service procedure document 12 is provided, and information about the source of the document is recorded. For example, the subject of one instance of the service procedure document 12 may be a particular engine, while another instance of the service procedure document 12 may deal with a front suspension. The service procedure document 12 must be a machine-readable document, such as a standard generalized markup language (SGML) or extensible markup language (XML) document.

At box 34, a set of diagnostic rules are used to extract fault model data from diagnostic fault information contained in the service procedure document 12. The service procedure document 12 will normally contain diagnostic fault information in the form of a table which shows what conditions may exist when a particular diagnostic trouble code is captured. A diagnostic trouble code (DTC) is a fault code captured by a controller onboard a vehicle when a parameter or a combination of parameters is detected to be outside its normal range. For example, a diagnostic fault information table in the service procedure document 12 may include rows containing different circuits, such as a pressure sensor signal line and a pressure sensor 5-volt reference line. The same diagnostic fault information table may include columns containing different failure modes for the circuits, such as short to ground and open circuit. The combination of a row and a column represents a complete failure mode, such as pressure sensor signal line short to ground. In the intersection of the row and column is one or more DTCs, if applicable, which represent the symptom(s) associated with the failure mode. An intersection of a row and column may also contain a description of a non-DTC symptom, as will be discussed below. Thus, a correlation is drawn between a failure mode and one or more symptoms, based on the diagnostic fault information contained in the service procedure document 12.

The diagnostic rules used at the box 34 may be relatively simple, for example, indicating that a causality weight of 1 is assigned where a symptom correlates to a failure mode. More complex diagnostic rules may also be defined, such as to handle a situation where more than one DTC symptom exists in an intersection of a row and a column. This fault model extraction is done at the box 34 for all combinations of symptoms and failure modes where the diagnostic fault information indicates a correlation. The diagnostic rules applied at the box 34 may also be used to capture mechanical faults and symptoms, if this data is available in a structured table, such as the diagnostic fault information table described above. An example of a mechanical failure mode is "brake rotor warped", and an associated symptom is "pulsation during braking". Although mechanical faults often do not trigger DTC symptoms, the faults and non-DTC symptoms may be contained in a structured table, and thus may be captured for the fault model 22 by the diagnostic rules at the box 34.

At box 36, a set of diagnostic rules are used to extract fault model data from scan tool tables typically contained in the service procedure document 12. A scan tool data table may contain similar rows and columns to the diagnostic fault information table described above, such as rows including a pressure sensor signal line and a pressure sensor 5-volt reference line, and columns including short to ground and open circuit. Thus, a failure mode could be represented by the combination of a row and a column, such as pressure sensor signal line short to ground. In the case of the scan tool data tables, the symptom which resides at the intersection of a row and a column is not a DTC, but rather is a scan tool value. For example, for the pressure sensor signal line short to ground, the scan tool value is 0 volts. Thus, a correlation is drawn between a failure mode and a symptom, based on the scan tool data tables contained in the service procedure document 12. This fault model extraction is done at the box 36 for all combinations of symptoms and failure modes where the scan tool data indicates a correlation.

At box 38, circuit and system testing procedures are parsed to obtain fault model data. The service procedure document 12 will often include circuit and system testing procedures which are designed to assist a service technician in diagnosing a problem. For example, in a case where a fuel tank pressure reading is inaccurate, the circuit and system testing procedure can be used to determine whether there is a problem with the fuel tank pressure sensor itself, a problem with the wiring circuit, a problem with the engine control module which processes the sensor signal, or some combination thereof.

The circuit and system testing procedures which are being parsed at the box 38 will typically describe a sequence of steps to be followed in order to diagnose a problem. An example showing how the circuit and system testing procedures can be parsed to extract symptoms and failure modes is discussed below. In summary, the parsing logic is defined as follows:

Search for verbs, such as "test" or "measure", in the test procedures.

Identify the circuit or system which immediately follows the verb, to determine what circuit or system is being tested, and what condition is being tested for; this defines a symptom.

Find a conditional statement and an action following the symptom, such as "if the measurement is this, then do this";

if the action is to replace a component, this represents the failure mode associated with the symptom.

if the action is to test something else, this represents another symptom to be tested for.

Using the parsing techniques described above, symptoms and failure modes can reliably be extracted from the circuit and system test procedures at the box 38. The service procedure document 12 may also include repair instructions, which may be parsed in the same manner as described above for circuit and system test procedures, in order to produce a set of symptoms and failure modes. The sequence of test steps and outcomes contained in the test procedures or repair instructions also produces a diagnostic tree, which is a connected set of symptoms and failure modes, discussed below. At box 40, reachability analysis is performed to learn hidden or cross-functional dependencies in the diagnostic tree which was captured at the box 38.

Figure 3:
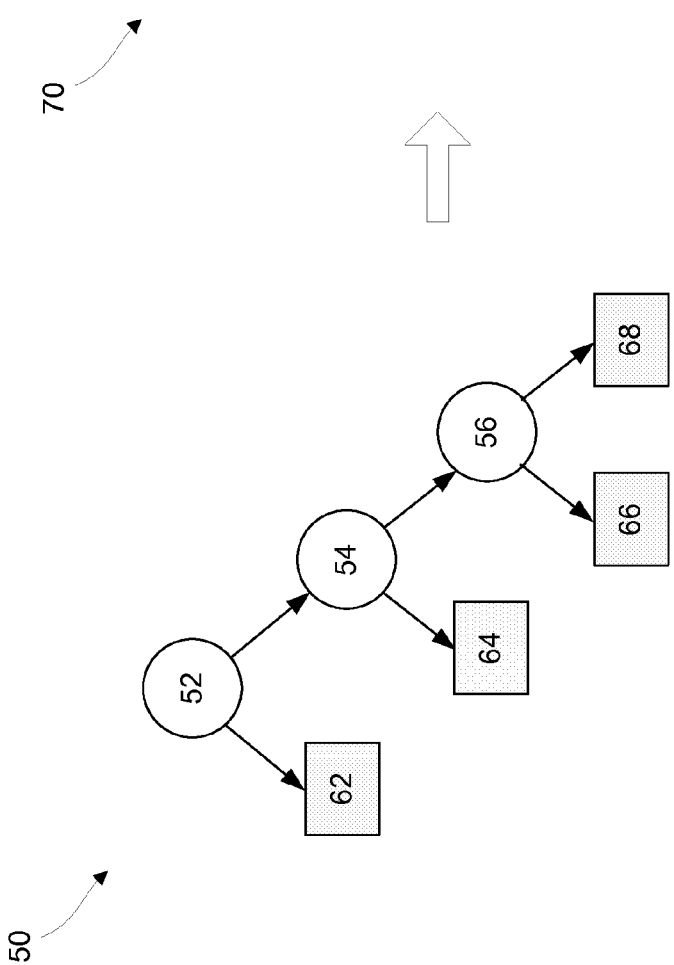
FIG. 3 is a diagram showing how a diagnostic tree created from a service procedure document can be used to find hidden dependencies in a fault model via reachability analysis.

FIG. 3 is a diagram showing how a diagnostic tree 50 can be constructed from circuit and system test procedures or repair instructions, and how data in the diagnostic tree 50 can be used to populate a fault model 70 using reachability analysis. As mentioned previously, the service procedure document 12 may include circuit & system testing procedures and/or repair instructions, which were parsed at the box 38 to obtain fault model content. The testing procedures or repair instructions typically include a sequence of steps, such as the following:

a) Measure the voltage between contact A and contact B.

b) If the voltage is less than X, then replace component 123.

c) If the voltage is greater than or equal to X, then measure the voltage between contact C and contact D.

The sequence of steps a)-c) above, plus additional steps from the service procedure document 12, can be drawn as the diagnostic tree 50 containing symptoms 52, 54, and 56, and failure modes 62, 64, 66, and 68. In the diagnostic tree 50, each of the symptoms 52-56 leads either to another symptom, or to a failure mode. For example, from steps a) and b) above, the symptom 52 could be written as "the voltage between contact A and contact B is less than X". If that statement is true, then the failure mode 62, component 123 faulty, can be diagnosed. However, if the statement describing the symptom 52 is not true, then the diagnostic tree 50 leads to another symptom, as described in statement c) above. In this way, the diagnostic tree 50 can be constructed from test procedures or repair instructions contained in the service procedure document 12.

The fault model 70, which could be a subset of the fault model 22, can be constructed from the diagnostic tree 50 with the symptoms 52-56 as columns and the failure modes 62-68 as rows, as shown. The next step is to populate the correlations or causality weights in each of the row-column intersections. It is a common practice to use data from diagnostic trees to identify fault model correlations for what are known as direct dependencies, where a verification of a symptom leads directly to a failure mode. In the diagnostic tree 50, the symptom 52 has a direct dependency relationship with the failure mode 62. Likewise for the symptom 54 and the failure mode 64. The symptom 56 has a direct dependency relationship with both the failure mode 66 and 68. These direct dependency relationships are shown with causality weight values of 1 in the fault model 70.

However, additional data is contained in the diagnostic tree 50, beyond the direct dependency relationships described above. Hidden or cross-functional dependencies may also exist, and may be identified via what is known as reachability analysis. Using reachability analysis, cross-functional dependencies are identified, for example, between the symptom 52 and the failure modes 64, 66, and 68. It can be seen that each of the failure modes 64-68 depends on more than just the presence or absence of the symptom 52. For example, the failure mode 64 also depends on the presence or absence of the symptom 54. A similar situation exists between the symptom 54 and the failure modes 66 and 68. Because of the indirect or cross-functional nature of these dependencies, causality weights less than 1 may be assigned.

The fault model 70 contains causality weights 72, 74, 76, 78, and 80, where each of the causality weights 72-80 represents a cross-functional dependency, and resides in an intersection of a failure mode row and a symptom column. As mentioned previously, each of the causality weights 72-80 is a value between 0 and 1, designating the degree of correlation between a particular failure mode and a particular symptom. Causality weights for cross-functional dependencies could be assigned based on how many levels a certain failure mode is removed from a certain symptom. For example, the causality weight 72 could be assigned a value of 0.5 because the failure mode 64 is one level removed from the symptom 52. Likewise, the causality weights 74 and 76 could be assigned a value of 0.25 because the failure modes 66 and 68 are two levels removed from the symptom 52. These causality weight assignment examples are merely illustrative; other objective criteria, or subject matter experts, could be used to assign causality weights to cross-functional dependencies which are revealed via reachability analysis. All of the other intersections or dependencies in the fault model 70 which are not populated by one of the causality weights 72-80 have a causality weight of 0, meaning no correlation, or 1, meaning a direct correlation. The reachability analysis performed at the box 40 will typically not add new failure mode rows or symptom columns to the fault model 22, but rather will populate the existing rows and columns with additional non-zero causality weights.

At box 42 of the flow chart diagram 30, the fault model 22 is assembled and provided as output of the structured text parsing module 18, containing failure modes, symptoms, and correlations identified from the diagnostic fault information at the box 34, the scan tool data at the box 36, the circuit and system testing procedures at the box 38, and the reachability analysis at the box 40. The fault model 22 can then be used for a variety of purposes, both onboard the vehicle 24 and off-board, as discussed previously. The fault model 22 can also be used as a baseline for rapid development of a high fidelity engineering fault model.

In order to more completely describe the fault model development methodology, an example will be discussed in some detail. The example will show how fault model content is extracted using the method of FIG. 2. In this example, service procedure information relating to part of an onboard telematics system is analyzed. In particular, the interaction of a telematics control module with a microphone is considered.

The telematics control module provides the microphone with a supplied voltage on a signal circuit. The telematics control module provides a ground for the microphone on a drain circuit. If there is any failure in the signal circuit, the drain circuit, the telematics control module, or the microphone, then a diagnostic trouble code designated as DTC B2455 is triggered. The DTC B2455 has an ambiguity group of seven failure modes, as follows:

1. Signal circuit short to ground or open.
2. Signal circuit short to voltage.
3. Telematics control module signal circuit connector failure
4. Telematics control module drain circuit connector failure.
5. Drain circuit open.
6. Drain circuit short to voltage.
7. Microphone failure.

The ambiguity group represents three different serviceable parts—namely, the telematics control module signal circuit connector, the telematics control module drain circuit connector, and the microphone—in addition to the seven failure modes.

Table 1 contains diagnostic fault information related to the telematics system microphone circuit discussed above, as would be found in the service procedure document 12.

TABLE 1

| Circuit | Short to Ground | Open | Short to Voltage |
|---|---|---|---|
| Microphone Signal | B2455 | B2455 | B2455 |
| Microphone Drain | — | B2455 | Note1 |

It can be seen in Table 1 that if the microphone signal circuit is shorted to ground or to voltage, or open circuited, the DTC B2455 will be triggered. If the microphone drain circuit is open, the DTC B2455 will also be triggered. Since the microphone drain circuit represents ground, there is no failure associated with a short to ground of the drain circuit. Finally, the situation where the drain circuit is shorted to voltage is not characterized by a DTC, but rather the diagnostic fault information table contains a note indicating what symptom would be exhibited in this case. In this example, Note1 describes the non-DTC symptom as "microphone inoperative—caller cannot be heard". As described previously in relation to the box 34 of the flow chart diagram 30, the fault model 22 can be populated by first combining a circuit name with a circuit failure type to produce a failure mode, such as "microphone signal short to ground". Then, for both DTC symptoms and non-DTC symptoms, correlations can be established based on the data in the diagnostic fault information table. For example, a causality weight of 1 could be assigned wherever a symptom is present for a particular failure mode.

Continuing with the example above, additional fault model data can be extracted from circuit and system testing procedures in the service procedure document 12. Because of the ambiguity group associated with the DTC B2455, the additional fault model data from the circuit and system testing procedures will be helpful in properly diagnosing a problem. An example of circuit and system testing procedures relating to the DTC B2455 is as follows:

1. Ignition OFF, disconnect the harness connector at the microphone.
2. Ignition OFF and scan tool disconnected, wait until all retained accessory power is OFF, test for less than 10 ohms between the drain circuit connector and ground, allowing up to 5 minutes for the circuit resistance to drop to its lowest reading.
   ⇒ If greater than the specified range, test the circuit for an open/high resistance.
3. Ignition ON, test for 9.5-10.5 V between the signal circuit connector and ground.
   ⇒ If less than the specified range, test the circuit for a short to ground or an open/high resistance. If the circuit tests normal, replace the telematics control module.
   ⇒ If greater than the specified range, test the circuit for a short to voltage. If the circuit tests normal, replace the telematics control module.
4. If all circuit tests normal, replace the microphone.

The circuit and system testing procedures, such as those listed above, can be parsed using the following rules:

1. Search for the words "test for", "test the", or "observe the" in the testing steps. Take the entire sentence having these words and save it as a technician test.
2. If there is a sentence beginning with the arrow character "⇒" then it is considered as a second level of tests and failures which is dependent on the preceding tests. Reachability analysis can be used to correlate the second level test with the first level failure mode.
3. Search for words "replace the" to construct failure modes and serviceable parts.
4. If there are multiple sentences under one bullet starting with the arrow character "⇒" then it indicates there are multiple modes of that failure mode.
5. Preserve the sequence of the tests by storing the bullet number along with the test and failure mode information.

In addition to the diagnostic fault information and circuit and system testing procedures, it is also possible to parse DTC setting conditions and running conditions, to learn negative correlations in the fault model; that is, DTCs that are not set with another specific DTC. Repair instructions are also parsed to learn serviceable parts that are not mentioned in the circuit and system testing procedures.

As a result of all of the parsing and analysis discussed above, a portion of the fault model 22 is developed, relating to the microphone circuit for the telematics system, as represented below by Table 2:

TABLE 2

|  | S1 | S2 | S3 | S4 | S5 | S6 |
|---|---|---|---|---|---|---|
| FM1 | 1 | 1 | 1 |  |  |  |
| FM2 |  |  |  |  |  |  |
| FM3 | 1 |  |  |  |  |  |
| FM4 | 1 |  |  | 1 | 1 |  |
| FM5 | 1 |  |  |  |  | 1 |
| FM6 | 1 |  |  | 1 |  |  |
| FM7 | 1 | 1 |  |  |  |  |

Where the symptoms S1-S6 are:
S1=DTC B2455
S2="2.0—test for less than 10 ohm between telematics module drain circuit connector and ground—B2455"
S3="2.1—test circuit for open/high resistance—B2455"
S4="3.0—test for 9.5-10.5 volts between telematics module signal circuit connector and ground—B2455"
S5="3.1—test circuit for short to ground or open/high resistance—B2455"
S6="3.2—test circuit for short to voltage—B2455"

And the failure modes FM1-FM7 are:
FM1="microphone drain circuit open"
FM2="microphone drain circuit short to voltage"
FM3="microphone failure"
FM4="microphone signal circuit short to ground or open"
FM5="microphone signal circuit short to voltage"

FM6="telematics control module signal circuit connector failure"

FM7="telematics control module drain circuit connector failure"

Where a value of 1 is shown in a row-column intersection in Table 2, this indicates a direct correlation between a particular symptom and a particular failure mode. Where no value is shown in an intersection, no correlation is indicated. As discussed previously, reachability analysis could be performed to discover cross-functional or indirect correlations, which could result in soft correlations, or causality weights between 0 and 1.

It is also possible that common faults could occur. For example, the telematics control module could exhibit a common fault in the ground and power circuits. This kind of fault will trigger multiple DTCs associated with the telematics control module—including the DTC B2455 which relates to the microphone circuit, as well as others. These common faults are often included in the service procedure document 12, and can be captured by the diagnostic rules at the box 34 discussed previously. In such a case, the fault model 22 will include a failure mode row for the common fault, and a correlation will be established for every applicable subsystem DTC symptom.

Fault model development from structured text documents, such as the service procedure document 12, can be a valuable tool, capable of quickly and completely capturing the wealth of fault model information contained in such documents. Using the techniques described above, structured text documents can be parsed and analyzed to produce the fault model 22. The fault model 22 can then be used, for example, to perform real-time fault diagnosis in an onboard computer in the vehicle 24, to perform off-board fault diagnosis using the diagnostic tool 26 or at a remote diagnostic center, or used by the vehicle development personnel 28 for updating service documents or designing future vehicles, systems, or components.

The benefits of being able to automatically develop fault models from text documents are numerous. One significant benefit is the ability to reliably create high-fidelity fault models from text documents with a minimal amount of human effort. Fault models for vehicles or complex sub-systems often contain thousands of symptoms and thousands of failure modes. Automating the process of creating these enormous documents yields a very large manpower savings. Also, by limiting human involvement to the review and disposition of a small number of borderline items, the opportunity for human error or oversight is greatly reduced. Another benefit of being able to develop the fault model 22 from text documents is the ability to capture valuable legacy service data which otherwise would likely not be used in fault model development. This can be done because, once the diagnostic rules are developed as described above, there is little more effort involved in applying the fault model development methodology to additional documents, including documents containing technical service bulletins, and historical or legacy service information.

Finally, the methods disclosed herein make it possible to discover and document hidden or overlooked correlations, thus improving the quality of the resultant fault model data. The fault model 22 is a powerful document which can enable a vehicle manufacturer to increase customer satisfaction, reduce warranty costs, and improve future product designs. The fault model 22 can also serve as a baseline for rapid development of a high fidelity engineering fault model.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for creating a fault model for a hardware or software system, said method comprising:
   providing a structured text document containing diagnostic information about the hardware or software system;
   extracting fault model data from the structured text document;
   parsing test procedures and repair instructions contained in the structured text document to produce a fault tree and to obtain additional fault model data;
   performing reachability analysis on the fault tree to identify cross-functional dependencies; and
   assembling the fault model from the fault model data and the cross-functional dependencies.

2. The method of claim 1 wherein extracting fault model data includes using diagnostic rules to extract the fault model data from diagnostic fault information and scan tool tables contained in the structured text document.

3. The method of claim 1 wherein parsing test procedures and repair instructions includes identifying a test for a first symptom, and identifying a failure mode and a second symptom which may be deduced from the test.

4. The method of claim 1 wherein performing reachability analysis on the fault tree includes determining where failure modes in the fault tree are cross-functionally dependent on more than one symptom.

5. The method of claim 1 wherein the fault model data includes symptoms, failure modes, and correlation values.

6. The method of claim 5 wherein the symptoms include Diagnostic Trouble Code (DTC) symptoms and non-DTC symptoms.

7. The method of claim 5 wherein assembling the fault model includes creating rows of the failure modes, creating columns of the symptoms, and placing the correlation values in intersections of the rows and the columns.

8. The method of claim 7 further comprising using the cross-functional dependencies to define additional correlation values in the fault model.

9. The method of claim 1 wherein the hardware or software system is a vehicle or a vehicle sub-system.

10. The method of claim 9 wherein the structured text document is a service procedure document for the vehicle or the vehicle sub-system.

11. A method for creating a fault model for a vehicle or a vehicle sub-system, said method comprising:
    providing a service procedure document containing diagnostic information about the vehicle or the vehicle sub-system;
    using diagnostic rules to extract fault model data from diagnostic fault information and scan tool tables contained in the service procedure document;
    parsing testing procedures and repair instructions contained in the service procedure document to produce a fault tree and to obtain additional fault model data;
    performing reachability analysis on the fault tree to identify cross-functional dependencies, where the reachability analysis includes determining where failure modes in the fault tree are cross-functionally dependent on more than one symptom; and
    assembling the fault model from the fault model data and the cross-functional dependencies.

12. The method of claim 11 wherein the fault model data includes symptoms, failure modes, and correlation values.

13. The method of claim 12 wherein assembling the fault model includes creating rows of the failure modes, creating columns of the symptoms, and placing the correlation values in intersections of the rows and the columns.

14. The method of claim 11 further comprising using the fault model for fault diagnosis in connection with the vehicle or the vehicle sub-system.

15. A system for creating a fault model, said system comprising:
   means for providing a structured text document containing diagnostic information about a hardware or software system;
   means for extracting fault model data from the structured text document;
   means for parsing test procedures and repair instructions contained in the structured text document to produce a fault tree and to obtain additional fault model data;
   means for performing reachability analysis on the fault tree to identify cross-functional dependencies; and
   means for assembling the fault model from the fault model data and the cross-functional dependencies.

16. The system of claim 15 wherein the means for extracting fault model data uses diagnostic rules to extract the fault model data from diagnostic fault information and scan tool tables contained in the structured text document.

17. The system of claim 15 wherein the means for parsing test procedures and repair instructions identifies a test for a first symptom, and identifies a failure mode and a second symptom which may be deduced from the test.

18. The system of claim 15 wherein the means for performing reachability analysis determines where failure modes in the fault tree are cross-functionally dependent on more than one symptom.

19. The system of claim 15 wherein the means for assembling the fault model creates rows of failure modes, creates columns of symptoms, and places a correlation values in intersections of the rows and the columns.

20. The system of claim 15 wherein the structured text document is a service procedure document, and the hardware or software system is a vehicle or a vehicle sub-system.

* * * * *